United States Patent [19]

Ohno et al.

[11] 4,365,824
[45] Dec. 28, 1982

[54] STABILIZER FOR VEHICLE

[75] Inventors: Akira Ohno; Toshiaki Sato; Kanji Inoue, all of Yokohama, Japan

[73] Assignee: NHK Spring Co., Ltd., Yokohama, Japan

[21] Appl. No.: 183,387

[22] Filed: Sep. 2, 1980

[30] Foreign Application Priority Data

Sep. 7, 1979 [JP] Japan ................................. 54-114974

[51] Int. Cl.³ ............................................. B60G 21/02
[52] U.S. Cl. ................................................... 280/689
[58] Field of Search .................. 280/689, 721; 148/39

[56] References Cited

U.S. PATENT DOCUMENTS 1,823,158  9/1931  Mogford et al.
3,352,724  11/1967 McNitt et al. .......................... 148/39
4,001,054  1/1977  Makpeace .............................. 148/39
4,138,141  2/1979  Andersen .............................. 280/689

Primary Examiner—Robert R. Song
Attorney, Agent, or Firm—Frishauf, Holtz, Goodman & Woodward

[57] ABSTRACT

A stabilizer for a vehicle comprises a torsion section, hardened and tempered curved sections integrally extending from the opposite ends of the torsion section and arm sections each integrally extending from each curved section and coupled to a vehicle suspension.

6 Claims, 5 Drawing Figures

STABILIZER FOR VEHICLE

BACKGROUND OF THE INVENTION

This invention relates to a stabilizer for a vehicle, which comprises a torsion section coupled to a vehicle frame, curved sections each integrally extending from each end of said torsion section and arm sections each integrally extending from each curved section and having a free end coupled to a wheel suspension.

Stabilizers of this sort have hitherto been used for the purpose of improving the feel of riding and stability of vehicles such as automobiles by improving the tilting of the vehicle caused at the time of turning due to centrifugal forces and unbalance of the road holding force on the opposite side wheels that is caused at such time. Usually, the stabilizer is constructed of a single elongate metal rod or pipe, which has a torsion section of uniform sectional dimensions and profile, curved sections integrally extending from the opposite ends of the torsion section and defining an obtuse angle and arm sections extending from the respective curved sections. The torsion section is coupled to the frame of the automobile or the like via mounting members such that it extends in the lateral direction, while the arm sections are coupled to the opposite sides of a wheel suspension via coupling sections provided at their free ends. Mounted in this way, the stabilizer acts to suppress the outward tilting of the vehicle and also the floating of the inner wheels at the time of turning of the vehicle.

Since this kind of stabilizer is formed by bending a single piece of material as mentioned above, a hot bending process is adopted, and the system is subsequently subjected to oil hardening or like heat treatment. However, since the eventual stabilizer is immersed in an oil trough without restricting it at all in the heat treatment step, it is liable to be thermally deformed. Such thermal deformation has to be corrected after the oil hardening treatment. Such correction is quite difficult. Besides, at the time of the correction, flows are likely to be caused to the product by the correction mold, thus spoiling the performance of the product.

After investigations conducted by the inventors concerning the load stress produced in the stabilizer, it has been proved that the maximum stress is produced in the curved section while the other sections are subject to bending stress or shearing stress based upon torsional forces that are low compared to the stress in the bending section, thus indicating that it is unnecessary to subject the entire eventual stabilizer to a heat treatment. The present invention is based upon this fact and provides a stabilizer, which can be manufactured economically without lowering its performance as a whole.

The invention is based upon the results of the investigations mentioned above, and its primary object is to provide a stabilizer for a vehicle at a low cost by imparting various parts of the stabilizer with adequate mechanical strengths.

SUMMARY OF THE INVENTION

To achieve the above objective of the invention, only the curved section of the eventual stabilizer between the torsion section and arm section thereof is subjected to a heat treatment.

By subjecting only the curved section to a heat treatment, it is possible to eliminate thermal deformation that may otherwise result from the heat treatment, particularly the hardening, and thus dispense with a step of correcting the deformation. With the elimination of the thermal deformation and dispensation of the correcting step, it is possible to improve the yield of the manufacture of the stabilizer.

DETAILED DESCRIPTION

Figure 1:
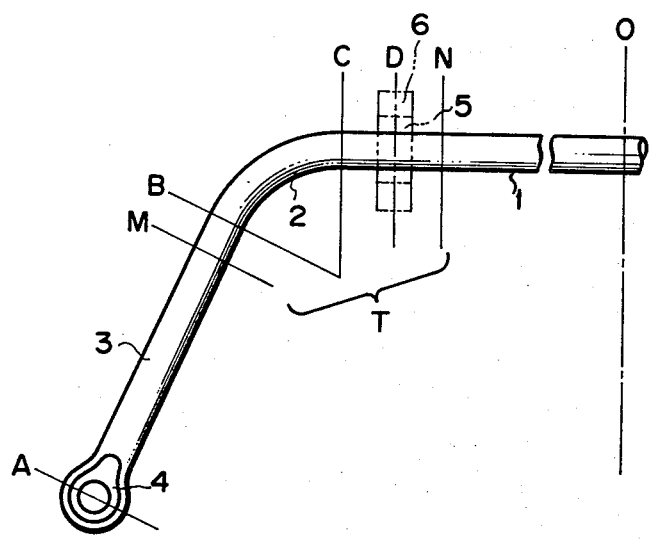
FIG. 1 is an elevational view showing a left hand half of the stabilizer for a vehicle according to the invention.

FIG. 1 shows a stabilizer made from a hollow rod or pipe and having a uniform sectional area and a uniform sectional profile. Designated at 1 is a torsion section. The stabilizer is line symmetrical in shape, so that only its portion on the left hand side of the line O of symmetry is shown in FIG. 1. The torsion section 1 terminates at its opposite ends in curved portions 2, which define an obtuse angle and terminate in turn in respective arm sections 3. Each arm section 3 has a coupling section 4, which is formed by means of forging and coupled to a suspension (not shown) of a vehicle. The curved section 2 is formed by using a bending mold (not shown) to provide a predetermined radius of curvature. The torsion section 1 is coupled at its opposite ends to the vehicle frame via rubber bushes 5 and mounting members 6 shown by imaginary lines.

Figure 2:
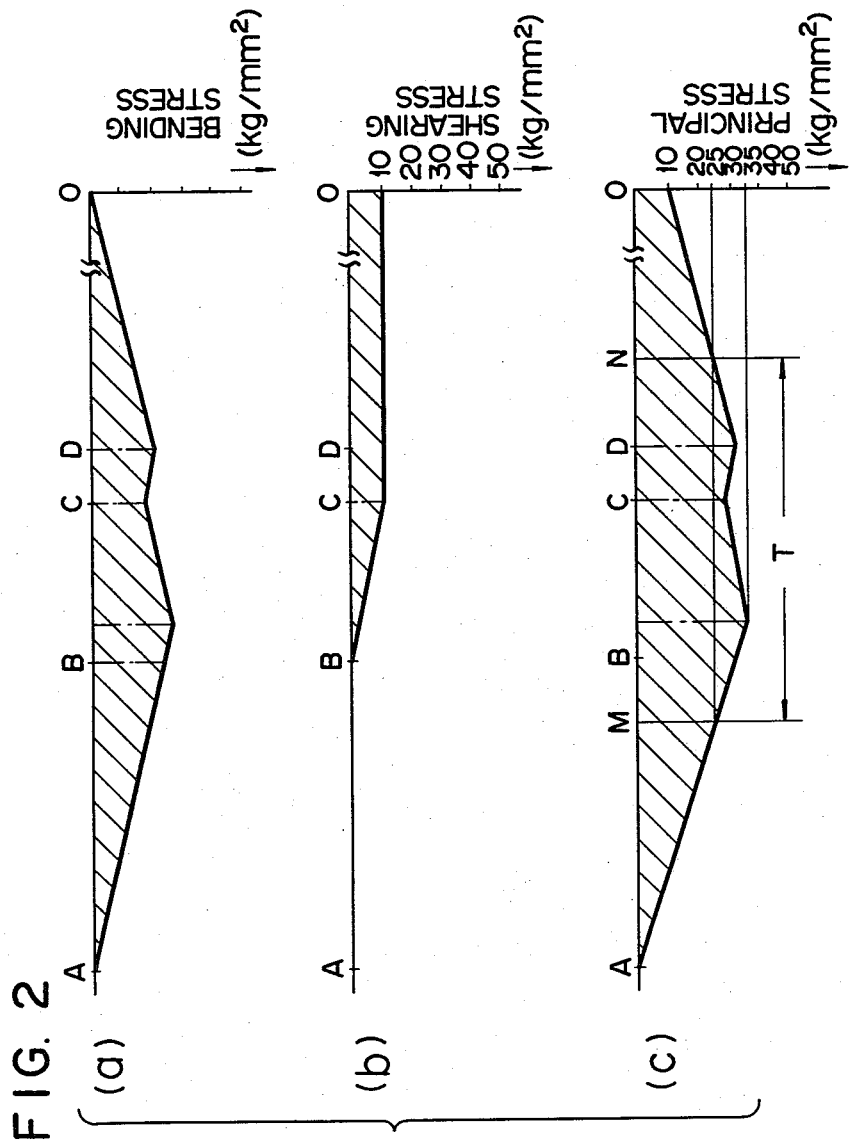
FIGS. 2(a), 2(b) and 2(c) show stress distribution characteristics of the stabilizer of FIG. 1.

FIGS. 2(a), 2(b) and 2(c) show the stress distribution in the stabilizer of FIG. 1 having the aforementioned construction. In these Figures, points A, B, C, D and O correspond to respective sections designated by like reference symbols in FIG. 1. Line O represents the center line of the vehicle. FIG. 2(a) shows the bending stress distribution. It will be seen that the bending stress produced is maximum in the curved section 2 between the positions B and C. FIG. 2(b) shows the torsional shearing stress distribution. As is seen, a uniform shearing stress is produced over the entire length C-O of the torsion section 1. FIG. 2(c) shows the principal stress distribution, which is the resultant of the stress distributions of FIGS. 2(a) and 2(b). As is seen from FIGS. 2(a), 2(b) and 2(c), the sole bending stress is present in the section A-B, while the resultant of the bending stress and torsional shearing stress is present in the section B-O, and the maximum principal stress is produced substantially in a mid portion of the curved section 2 between positions B and C. It will thus be understood that in many cases a point of rupture due to fatigue occurs between the points B and C, and this is verified in practice.

While the aforementioned maximum principal stress varies with the shape, size and kind of the vehicle and the shape of the stabilizer, it is empirically known that with some kinds of vehicles the torsional maximum principal stress is 35 kg/mm$^2$.

Figure 3:
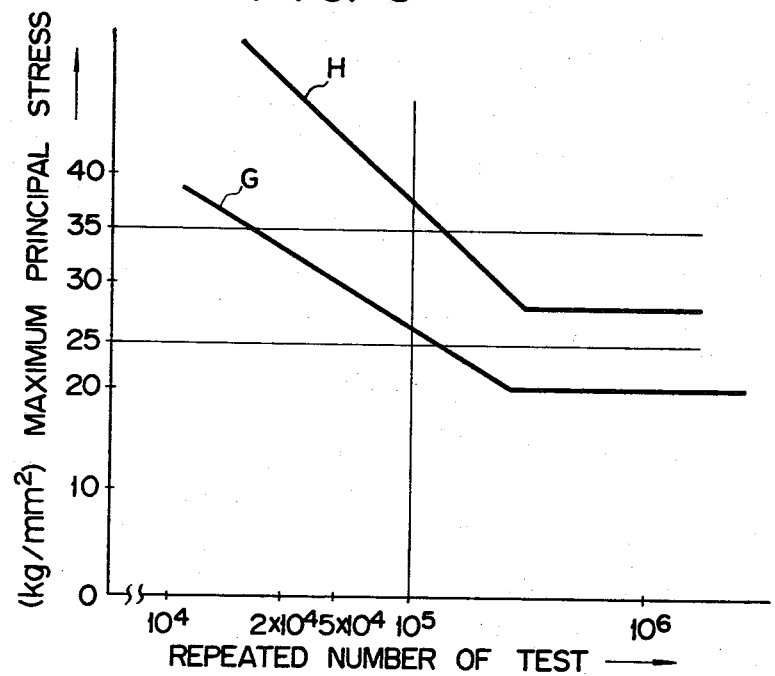
FIG. 3 is a graph showing the relation between the maximum principal stress of the stabilizer of FIG. 1 and the number of repetitions of test.

FIG. 3 shows the relation between the maximum principal stress and the number of repeated tests. The carbon steel pipe STKM 17 for mechanical constructions has a characteristic as shown by plot G in FIG. 3 in situ (HRC being 20 or less), while the same material is imparted with a characteristic as shown by plot H in FIG. 3 after heat treatment including a hardening process (HRC being 40 or above). It will be seen if the aforementioned maximum principal stress is 35 kg/mm$^2$, the fatigue life of the material STKM 17 in situ (plot G) corresponds to about twenty thousand repeated tests, whereas the material STKM 17 provided with the heat treatment (plot H) can withstand more than hundred thousand repeated tests with the maximum principal stress of 35 kg/mm$^2$. From this, it has been in practice to uniformly subject the entire material to a hardening treatment and guarantee a quality corresponding to over several hundred thousand times of rupture testing. However, it is recognized that even the material STKM 17 without any heat treatment provided can have a fatigue life of over a hundred thousand times of testing provided the maximum principal stress is no higher than 25 kg/mm$^2$. This means that the eventual stabilizer may be heat treated only over its section subject to the maximum principal stress of 25 kg/mm$^2$ or above in FIG. 2(c), i.e., over a section T between points M and N by means of high frequency hardening.

Thus, in the instant embodiment, only the section M-N including the curved section 2 is high frequency hardened, the rest of the material being held in situ. Even by so doing, a stabilizer having the same fatigue life as that of the prior-art stabilizer obtained by hardening the entire material is obtainable.

While the partial hardening is of course by no means limited to high frequency hardening, by using high frequency hardening it is possible to readily harden even a material which is difficult to harden.

Further, the stabilizer need not be made of a hollow member. The same effects can be obtained with a solid member.

As has been described in the foregoing, the stabilizer according to the invention, which comprises a torsion section terminating at the opposite ends in curved sections which in turn terminate in arm sections, is obtained by hardening only the curved sections while giving the rest no hardening treatment. Thus, with this stabilizer the mechanical strength is improved for the curved sections, in which the stress is concentrated, so that it is possible to obtain the same fatigue life as that of the prior-art stabilizer obtained by hardening the entire material. In addition, since according to the invention it is not necessary to heat treat the entire material, it is possible to eliminate deformation that may result in the case of hardening the entire material, and a step of correcting such deformation is not needed. Thus, it is possible to save energy and simplify the manufacturing process, thus permitting the improvement of the yield and saving of man-hours.

What we claim is:

1. A stabilizer for a vehicle, the stabilizer being a single, one piece, unitary structure, comprising:
   a torsion section coupled to the vehicle, said torsion section having opposite ends;
   curved sections integrally extending from the respective opposite ends of said torsion section, said curved sections being heat treated to increase the mechanical strength of said curved sections; and
   arm sections each respectively integrally extending from each of said curved sections and having a free end coupled to a vehicle suspension;
   at least major portions of said torsion section and said arm sections not being heat treated.

2. A stabilizer according to claim 1, wherein said curved sections are heat treated to increase the hardness thereof.

3. A stabilizer according to claim 2, wherein said curved sections are subjected to a heat treatment which includes tempering.

4. A stabilizer according to claim 1, wherein said single, one piece, unitary stabilizer structure is a hollow member.

5. A stabilizer according to claim 1, wherein said single, one piece, unitary stabilizer structure is a solid member.

6. A stabilizer according to claim 2, wherein said curved sections are high frequency hardened.

* * * * *